US006784269B2

(12) United States Patent
Lin et al.

(10) Patent No.: US 6,784,269 B2
(45) Date of Patent: Aug. 31, 2004

(54) POLYPROPYLENE COMPOSITIONS METHODS OF MAKING THE SAME

(75) Inventors: Chon Y. Lin, Houston, TX (US); Michael C. Chen, Houston, TX (US); Aspy K. Mehta, Humble, TX (US); Rajan K. Chudgar, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 57 days.

(21) Appl. No.: 10/177,073

(22) Filed: Jun. 20, 2002

(65) Prior Publication Data

US 2003/0088022 A1 May 8, 2003

Related U.S. Application Data

(60) Continuation-in-part of application No. 09/707,650, filed on Nov. 7, 2000, now Pat. No. 6,476,173, which is a division of application No. 09/293,656, filed on Apr. 16, 1999, now Pat. No. 6,207,750.
(60) Provisional application No. 60/085,317, filed on May 13, 1998.

(51) Int. Cl.[7] .......................... C08F 210/06; C08F 10/06
(52) U.S. Cl. ..................... 526/348.1; 526/351; 526/160; 526/943
(58) Field of Search .............................. 526/348.1, 351, 526/160, 943, 65

(56) References Cited

U.S. PATENT DOCUMENTS

| | | | |
|---|---|---|---|
| 4,530,914 A | 7/1985 | Ewen et al. | 502/113 |
| 4,542,199 A | 9/1985 | Kaminsky et al. | 526/160 |
| 4,665,208 A | 5/1987 | Welborn, Jr. et al. | 556/179 |
| 4,701,432 A | 10/1987 | Welborn, Jr. | 502/113 |
| 4,769,910 A | 9/1988 | Noon | 30/91.2 |
| 4,808,561 A | 2/1989 | Welborn, Jr. | 502/113 |
| 4,849,487 A | 7/1989 | Kaminsky et al. | 526/160 |
| 4,871,705 A | 10/1989 | Hoel | 502/117 |
| 4,874,734 A | 10/1989 | Kioka et al. | 502/104 |
| 4,908,463 A | 3/1990 | Bottelberghe | 556/179 |
| 4,921,825 A | 5/1990 | Kioka et al. | 502/104 |
| 4,923,833 A | 5/1990 | Kioka et al. | 502/9 |
| 4,924,018 A | 5/1990 | Bottelberghe | 556/179 |
| 4,933,403 A | 6/1990 | Kaminsky et al. | 526/160 |
| 4,937,299 A | 6/1990 | Ewen et al. | 526/119 |
| 4,952,540 A | 8/1990 | Kioka et al. | 502/9 |
| 4,968,827 A | 11/1990 | Davis | 556/179 |
| 5,017,714 A | 5/1991 | Welborn, Jr. | 556/12 |
| 5,026,798 A | 6/1991 | Canich | 526/127 |
| 5,057,475 A | 10/1991 | Canich et al. | 502/104 |
| 5,091,352 A | 2/1992 | Kioka et al. | 502/104 |
| 5,103,031 A | 4/1992 | Smith, Jr. | 556/179 |
| 5,120,867 A | 6/1992 | Welborn, Jr. | 556/12 |
| 5,145,819 A | 9/1992 | Winter et al. | 502/117 |
| 5,157,137 A | 10/1992 | Sangokoya | 556/179 |
| 5,198,401 A | 3/1993 | Turner et al. | 502/155 |
| 5,204,419 A | 4/1993 | Tsutsui et al. | 526/153 |
| 5,206,199 A | 4/1993 | Kioka et al. | 502/117 |
| 5,235,081 A | 8/1993 | Sangokoya | 556/179 |
| 5,239,022 A | 8/1993 | Winter et al. | 526/127 |
| 5,240,894 A | 8/1993 | Burkhardt et al. | 502/108 |
| 5,243,001 A | 9/1993 | Winter et al. | 526/127 |
| 5,248,801 A | 9/1993 | Sangokoya | 556/179 |
| 5,252,389 A | 10/1993 | Schmidt et al. | 428/334 |
| 5,276,208 A | 1/1994 | Winter et al. | 556/53 |
| 5,278,119 A | 1/1994 | Turner et al. | 502/155 |
| 5,280,074 A | 1/1994 | Schreck et al. | 525/240 |
| 5,296,434 A | 3/1994 | Karl et al. | 502/117 |
| 5,304,614 A | 4/1994 | Winter et al. | 526/127 |
| 5,308,815 A | 5/1994 | Sangokoya | 502/104 |
| 5,322,902 A | 6/1994 | Schreck et al. | 525/247 |
| 5,324,800 A | 6/1994 | Welborn, Jr. et al. | 526/160 |
| 5,329,032 A | 7/1994 | Tran et al. | 556/179 |
| 5,329,033 A | 7/1994 | Spaleck et al. | 556/53 |
| 5,346,925 A | 9/1994 | Sugano et al. | 521/54 |
| 5,350,723 A | 9/1994 | Neithamer et al. | 502/104 |
| 5,350,817 A | 9/1994 | Winter et al. | 526/119 |
| 5,374,752 A | 12/1994 | Winter et al. | 556/11 |
| 5,391,790 A | 2/1995 | Rohrmann et al. | 556/28 |
| 5,407,884 A | 4/1995 | Turner et al. | 502/155 |
| 5,483,002 A | 1/1996 | Seelert et al. | 525/240 |
| 5,483,014 A | 1/1996 | Turner et al. | 526/113 |
| 5,510,502 A | 4/1996 | Sugano et al. | 556/11 |
| 5,532,325 A | 7/1996 | Oka et al. | 526/79 |
| 5,641,848 A | 6/1997 | Giacobbe et al. | 526/348 |
| 5,643,847 A | 7/1997 | Walzer, Jr. | 502/117 |
| 5,672,668 A | 9/1997 | Winter et al. | 526/127 |
| 5,741,563 A * | 4/1998 | Mehta et al. | 428/35.1 |
| 6,063,482 A * | 5/2000 | Peiffer et al. | 428/213 |

FOREIGN PATENT DOCUMENTS

| | | |
|---|---|---|
| CA | 2133181 | 3/1995 |
| CN | 1266066 A | 3/1999 |
| DE | 196 22 083 A1 | 12/1997 |
| EP | 0 277 004 | 8/1988 |

(List continued on next page.)

OTHER PUBLICATIONS

Derwent Abstract for EP 0 516 018, Dec. 2, 1992.
Derwent Abstract for EP 0 702 030, Mar. 20, 1996.
"Termination of Polymer Chain Growth" Zeigler–Natta Catalysts and Polymerizations, J. Boor, Jr., pp. 244–260 (Academic Press 1979).

(List continued on next page.)

Primary Examiner—Ling-Siu Choi
(74) Attorney, Agent, or Firm—Paige Schmidt; Kevin M. Faulkner; Leandro Arecheolerr

(57) ABSTRACT

This invention relates to propylene homopolymer compositions obtained from metallocene catalysis wherein the polymer has a molecular weight distribution (Mw/Mn) in the range of from 4.0 to 20.0. The propylene homopolymer composition may be prepared in a multiple stage polymerization process using the same metallocene component in at least two stages. The composition may comprise isotactic homopolymer in one embodiment, and have a hexane extractables of less than 2 wt % in one embodiment. The composition is useful in making films.

10 Claims, 3 Drawing Sheets

FOREIGN PATENT DOCUMENTS

| | | |
|---|---|---|
| EP | 0 279 586 B | 8/1988 |
| EP | 0 279 863 B | 8/1988 |
| EP | 0 320 762 B | 6/1989 |
| EP | 0 354 893 B | 2/1990 |
| EP | 0 426 637 A | 5/1991 |
| EP | 0 495 375 A | 7/1992 |
| EP | 0 500 944 A | 9/1992 |
| EP | 0 507 876 B | 10/1992 |
| EP | 0 520 732 A | 12/1992 |
| EP | 0 549 900 A | 7/1993 |
| EP | 0 551 277 B | 7/1993 |
| EP | 0 561 476 A | 9/1993 |
| EP | 0 570 982 A | 11/1993 |
| EP | 0 573 403 A | 12/1993 |
| EP | 0 576 970 A | 1/1994 |
| EP | 0 594 218 A | 4/1994 |
| EP | 0 611 795 | 8/1994 ............ C08J/9/18 |
| EP | 0 662 979 B | 7/1995 |
| EP | 0 670 334 A | 9/1995 |
| EP | 0 672 689 A | 9/1995 |
| EP | 0 736 552 A | 10/1996 |
| WO | WO 94/03506 | 2/1994 |
| WO | WO 94/10180 | 5/1994 |
| WO | WO 94/28034 | 12/1994 |
| WO | WO 95/08285 | 3/1995 |
| WO | WO 96/00243 | 1/1996 |
| WO | WO 96/00245 | 1/1996 |
| WO | WO 97/10300 | 3/1997 |
| WO | WO 98/10016 | 3/1998 |
| WO | WO 99/16797 | 4/1999 |
| WO | WO 99/58587 | 11/1999 .......... C08F/110/06 |
| WO | WO 01/32758 | 5/2001 |

OTHER PUBLICATIONS

Ferdinand R. W.P. Wild, et al., "ansa–Metallocene Derivatives—V11. Synthesis and Crystal Structure of a Chiral ansa–Zirconocene Derivative with Ethylene–Bridged Tetrahydroindenyl Ligands" —*Journal of Organometallic Chemistry*, v. 288.(1985) pp. 63–67.

Book—*Ziegler–Natta Catalyst and Polymerization Hydrogen*; J. Boor (Academic Press, 1979).

\* cited by examiner

POLYPROPYLENE COMPOSITIONS METHODS OF MAKING THE SAME

CROSS-REFERENCE TO RELATED APPLICATIONS

This is a Continuation-in-Part Application of U.S. Ser. No. 09/707,650, filed Nov. 7, 2000, now U.S. Pat. No. 6,476,173 B1, which is a Divisional Application of U.S. Ser. No. 09/293,656, filed Apr. 16, 1999, now U.S. Pat. No. 6,207,750 B1, which claims the benefit of Provisional Application U.S. Ser. No. 60/085,317, filed May 13, 1998.

FIELD OF THE INVENTION

This invention relates generally to isotactic propylene homopolymer compositions and to methods for their production and use.

BACKGROUND

Multiple stage polymerization processes are known in the art as is the use of metallocene catalyst systems. Multiple stage polymerization processes, such as two-stage polymerization processes, are generally used to prepare block copolymers which contain rubbery materials. Two-stage polymerization process products may include propylene block copolymers. In some instances, the propylene/ethylene copolymer portion of these block copolymers may be rubbery. In these instances, these products may be more suitable for molding applications rather than films. In other instances, two or more metallocenes may be used for the preparation of isotactic propylene polymers.

Related patents and patent applications include: U.S. Pat. Nos. 5,280,074; 5,322,902; 5,346,925; 5,350,817; 5,483,002; 5,741,563; 6,063,482 and Canadian Patent Application No. 2,133,181

SUMMARY OF THE INVENTION

It has been discovered that isotactic olefinic polymer compositions, desirably propylene homopolymer compositions, may be made by polymerizing olefins such as propylene in one stage using a metallocene catalyst system and then further polymerized in a separate stage using the same catalyst system to further polymerize the polymer but to a different molecular weight. The different molecular weights are produced by varying the concentration of a chain transfer agent such as hydrogen.

The resulting polymers have surprisingly high molecular weight and broad molecular weight distribution, and offer processability benefits in many applications but particularly in oriented film applications. By "broad molecular weight distribution", it is meant that the ratio of the weight average molecular weight to number average molecular weight (Mw/Mn, or MWD) for the resulting polymer compositions of the present invention is from 2.5 to 20 in one embodiment, and greater than 3.5 in another embodiment, and greater than 4.0 in another embodiment, and greater than 4.2 in another embodiment, and greater than 4.5 in yet another embodiment, and greater than 4.8 in yet another embodiment, and greater than 5.0 in yet another embodiment, and less than 20 in yet another embodiment, and less than 10.0 in another embodiment, and less than 8.0 in yet another embodiment, wherein a desirable MWD range may be any combination of any upper limit with any lower limit described herein. Films made from these unique polymer compositions have a significantly broader processability range and can be evenly stretched at lower temperatures compared to the polypropylene films available today. The resulting films have a favorable balance of properties including high strength, good optical properties, excellent shrinkage and good barrier properties.

As such, this invention relates to a propylene polymer composition in one embodiment which includes propylene homopolymer, the composition possessing a molecular weight distribution in the range from 4.0 to 20.0 in one embodiment, and having hexane extractables of less than 2.0 wt % in another embodiment. When composition is formed into a film, the biaxially oriented film properties further characterize this propylene polymer composition. For example, the propylene polymer film, having pre-stretched dimensions of 50.8 mm×50.8 mm×20 mil (0.508 mm), exhibits an even stretch when stretched to a final stretched thickness of 0.75 mil (19 µm) between the temperature ranges of from 149° C. to 159° C. on a T. M. Long biaxial stretching apparatus in one embodiment, and from 150° C. to 158° C. in another embodiment, and from 151.7° C. to 157.2° C. in yet another embodiment. Before stretching, the film is preheating for 27 seconds at the stretching temperature. The film is stretched at a rate of 76.2 mm/sec.

In another embodiment, the propylene polymer composition may include a blend of first and second propylene homopolymers. The first propylene homopolymer may have a melt flow rate in the range of 0.15 dg/min to 4.0 dg/min and a molecular weight distribution in the range of 1.8 to 2.5. The second propylene homopolymer may have a melt flow rate in the range of 5 dg/min to 1000 dg/min and a molecular weight distribution in the range of 1.8 to 2.5. The polymer composition thus has a broad MWD, such as from 4.0 to 20 in one embodiment.

DETAILED DESCRIPTION OF THE INVENTION

Figure 1:
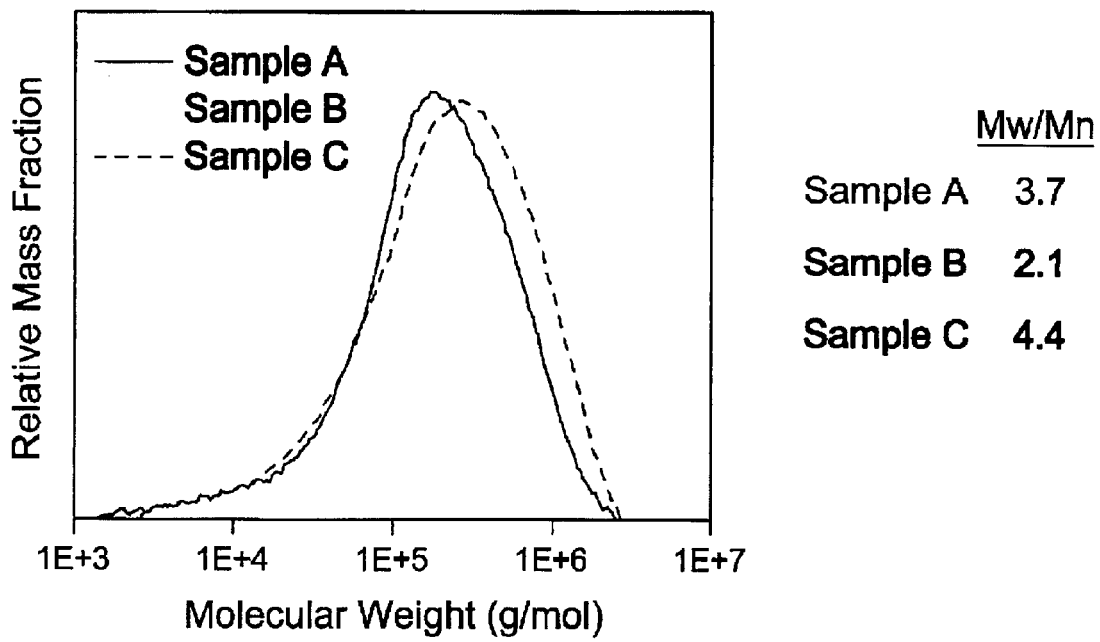
FIG. 1 is a plot of the GPC Molecular Weight Distribution of example and comparative polymers of the invention.

This invention relates to (1) methods for making homopolypropylene having a broad MWD that is suitable for films such as oriented films; (2) homopolypropylene compositions suitable for films; and (3) products such as films made from homopolypropylene compositions. These are described in turn below.

As used herein, "isotactic" is defined as having at least 40% isotactic pentads according to analysis by $^{13}$C-NMR. As used herein, "highly isotactic" is defined as having at least 60% isotactic pentads according to analysis by $^{13}$C-NMR.

As used herein, "molecular weight" means weight average molecular weight (Mw) and "molecular weight distribution," (MWD), means Mw divided by number average molecular weight (Mn) as determined by gel permeation chromatography (GPC). As used herein, unless otherwise stated, "polymerization" means homopolymerization.

Methods for Making Isotactic Propylene Polymer Compositions

The methods of this invention involve the use of metallocene catalyst systems that comprise a metallocene component and at least one activator. Preferably, these catalyst system components are supported on support material.

Metallocenes

As used herein "metallocene" and "metallocene component" refer generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790.

Preferred metallocenes are those represented by the formula:

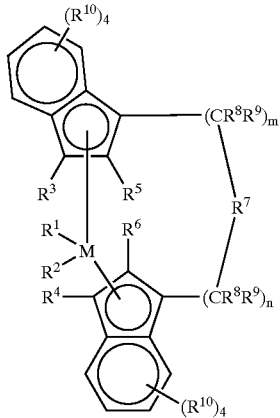

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$ preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

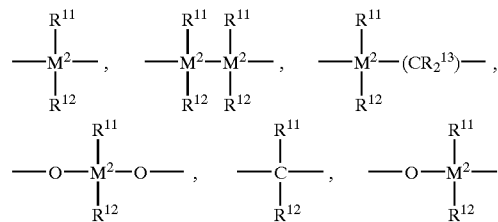

—$B(R^{11})$—, —$Al(R^{11})$—, —Ge—, —Sn—, —O—, —S—, —SO—, —$SO_2$—, —$N(R^{11})$—, —CO—, —$P(R^{11})$—or —$P(O)(R^{11})$—; wherein, $R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems; $M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^3$, $R^4$, and $R^{10}$ are identical or different and have the meanings stated for $R^{11}$, $R^{12}$ and $R^{13}$. Two adjacent $R^{10}$ radicals can be joined together to form a ring system, preferably a ring system containing from 4–6 carbon atoms.

Alkyl refers to straight or branched chain substituents. Halogen (halogenated) refers to fluorine, chlorine, bromine or iodine atoms, preferably fluorine or chlorine.

Particularly preferred metallocenes are compounds of the structures (A) and (B):

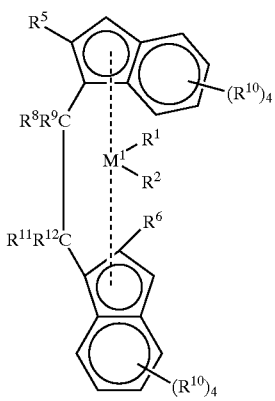

(A)

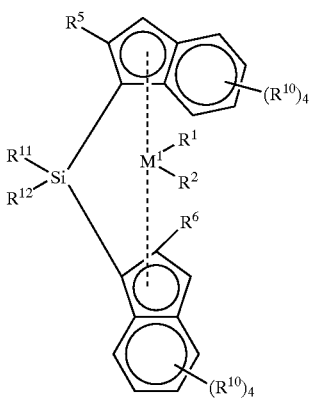

(B)

wherein $M^1$ is Zr or Hf, $R^1$ and $R^2$ are methyl or chlorine, and $R^5$, $R^6$, $R^8$, $R^9$, $R^{10}$, $R^{11}$ and $R^{12}$ have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, these metallocenes are prepared by a multi-step process involving repeated deprotonations/metallations of the aromatic ligands and introduction of the bridge and the central atom by their halogen derivatives. The following reaction scheme illustrates this generic approach:

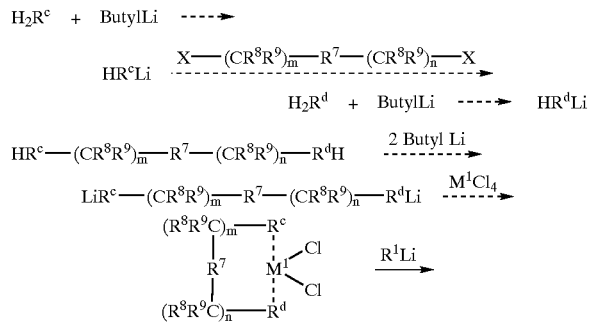

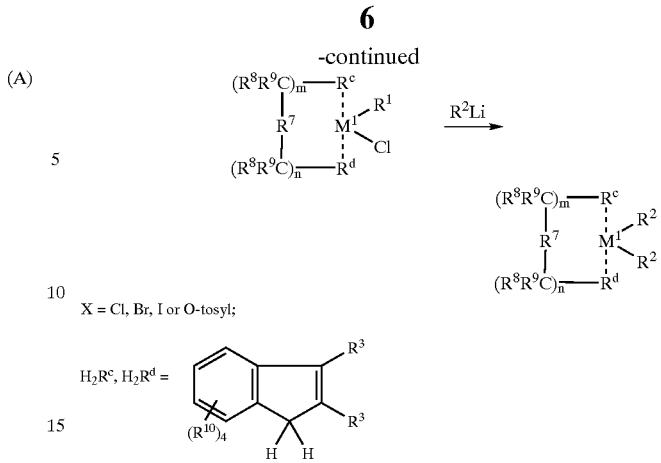

X = Cl, Br, I or O-tosyl;

$H_2R^c$, $H_2R^d$ =

Additional methods for preparing metallocenes are fully described in the 288 JOURNAL OF ORGANOMETALLIC CHEM. 63–67 (1985), and in EP-A-320762.

Illustrative but non-limiting examples of preferred metallocenes include:

Dimethylsilandiylbis(2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl) ZrCl$_2$;
Dimethylsilandiylbis(2-ethyl-4-phenyl-1-indenyl)ZrCl$_2$;
Dimethylsilandiylbis(2-ethyl-4-naphthyl-1-indenyl)ZrCl$_2$,
Phenyl(methyl)silandiylbis(2-methyl-4-phenyl-1-indenyl) ZrCl$_2$,
Dimethylsilandiylbis(2-methyl-4-(1-naphthyl)-1-indenyl) ZrCl$_2$,
Dimethylsilandiylbis(2-methyl-4-(2-naphthyl)-1-indenyl) ZrCl$_2$,
Dimethylsilandiylbis(2-methyl-indenyl)ZrCl$_2$,
Dimethylsilandiylbis(2-methyl-4,5-diisopropyl-1-indenyl) ZrCl$_2$,
Dimethylsilandiylbis(2,4,6-trimethyl-1-indenyl)ZrCl$_2$,
Phenyl(methyl)silandiylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilandiylbis(2-methyl-4-ethyl-1-indenyl)ZrCl$_2$,
Dimethylsilandiylbis(2-methyl-4-isopropyl-1-indenyl) ZrCl$_2$,
Dimethylsilandiylbis(2-methyl-4-t-butyl-1-indenyl)ZrCl$_2$,
Phenyl(methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl) ZrCl$_2$,
Phenyl(methyl)silandiylbis(2-methyl-4,5-benzo-1-indenyl) ZrCl$_2$,
Phenyl(methyl)silandiylbis(2-methyl-4,5-(methylbenzo)-1-indenyl)ZrCl$_2$,
Phenyl(methyl)silandiylbis(2-methyl-4,5-(tetramethyl-benzo)-1-indenyl)ZrCl$_2$,
Phenyl(methyl)silandiylbis (2-methyl-a-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl-4,5-benzo-1-indenyl)ZrCl$_2$, 1,2-Ethandiylbis(2,4,7-trimethyl-1-indenyl)ZrCl$_2$,
Dimethylsilandiylbis(2-methyl-1-indenyl) ZrCl$_2$,
1,2-Ethandiylbis(2-methyl-1-indenyl)ZrCl$_2$,
Phenyl(methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl) ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(methyl)silandiylbis(2-methyl-5-isobutyl-1-indenyl) ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, the methylated ($R^1$ and $R^2$ are methyl groups) derivatives of each of these, and the like.

These metallocene catalyst components are described in detail in U.S. Pat. Nos. 5,145,819; 5,243,001; 5,239,022; 5,329,033; 5,296,434; 5,276,208; 5,672,668, 5,304,614 and 5,374,752; and EP 549 900 and 576 970. Additionally, metallocenes such as those described in U.S. Pat. No. 5,510,502 are suitable for use in this invention.

Activators

Metallocenes are generally used in combination with some form of activator. The term "activator" is defined herein to be any compound or component, or combination of compounds or components, capable of enhancing the ability of one or more metallocenes to polymerize olefins to polyolefins. Alkylalumoxanes are preferably used as activators, most preferably methylalumoxane (MAO). Generally, the alkylalumoxanes preferred for use in olefin polymerization contain from 5 to 40 of the repeating units:

R(AlR'O)xAlR$_2$ for linear species and (AlRO)x for cyclic species where R and R' are $C_1$–$C_8$ alkyls, including mixed alkyls. Particularly preferred are the compounds in which R and R' are methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031 and EP-A-0 561 476; EP-B1-0 279 586; EP-A-0 594-218 and WO 94/10180. (As used herein unless otherwise stated "solution" refers to any mixture including suspensions.)

Ionizing activators may also be used to activate metallocenes. These activators are neutral or ionic, or are compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used, for example, alumoxane and ionizing activators in combinations, see for example, EP 662 979.

Descriptions of ionic catalysts for coordination polymerization comprised of metallocene cations activated by non-coordinating anions appear in the early work in U.S. Pat. Nos. 5,278,119; 5,407,884; 5,483,014; 5,198,401; EP 277 004 and EP 551 277; EP 670 688; EP 670 334 and EP 672 689. These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient liability to permit displacement by an ethylenically or acetylenically unsaturated monomer during polymerization.

The use of ionizing ionic compounds not containing an active proton but capable of producing both the active metallocene cation and a noncoordinating anion is also known. See, EP 426 637 and EP 573 403. An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP 520 732. Ionic catalysts for addition polymerization can also be prepared by oxidation of the metal centers of transition metal compounds by anion pre-cursors containing metallic oxidizing groups along with the anion groups, see EP 495 375.

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP 500 944 and EP 0 570 982 for in situ processes describing the reaction of alkyl aluminum compounds with dihalo-substituted metallocene compounds prior to or with the addition of activating anionic compounds.

Support Materials

The catalyst systems used in the process of this invention are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from 10 to 700 m$^2$/g, a total pore volume in the range of from 0.1 to 4.0 cc/g and an average particle size in the range of from 10 to 500 µm. More preferably, the surface area is in the range of from 50 to 500 m$^2$/g, the pore volume is in the range of from 0.5 to 3.5 cc/g and the average particle size is in the range of from 20 to 200 µm. Most preferably the surface area is in the range of from 100 to 400 m$^2$/g, the pore volume is in the range of from 0.8 to 3.0 cc/g and the average particle size is in the range of from 30 to 100 µm. The average pore size of typical porous support materials is in the range of from 10 to 1000Å. Preferably, a support material is used that has an average pore diameter of from 50 to 500Å, and most preferably from 75 to 350Å. It may be particularly desirable to dehydrate the silica at a temperature of from 100° C. to 800° C. anywhere from 3 to 24 hours.

The metallocenes, activator and support material may be combined in any number of ways. Suitable support techniques are described in U.S. Pat. Nos. 4,808,561 and 4,701,432. Preferably the metallocenes and activator are combined and their reaction product supported on the porous support material as described in U.S. Pat. No. 5,240,894 and EP 705 281; EP 766 700; and EP 766 702. Alternatively, the metallocene may be preactivated separately and then combined with the support material either separately or together. If the metallocene and activator are separately supported, then preferably they are dried and combined as a powder before use in polymerization.

Regardless of whether the metallocene and activator are separately precontacted or whether the metallocene and activator are combined at once, the total volume of reaction solution applied to porous support is preferably less than 4 times the total pore volume of the porous support, more preferably less than 3 times the total pore volume of the porous support.

Methods of supporting ionic catalysts comprising metallocene cations and noncoordinating anions are described in EP 507 876; EP 702 700 and U.S. Pat. No. 5,643,847. The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825; and EP 279 863 and EP 354 893.

Polymerization Processes

The polymer compositions of this invention are generally prepared in a multiple stage process wherein homopolymerization is conducted in each stage separately in parallel or, preferably in series. In each stage propylene is homopolymerized preferably with the same catalyst system but with a different concentration of chain termination agent in at least two of the stages.

Examples of chain termination agents are those commonly used to terminate chain growth in Ziegler-Natta polymerization, a description of which can be found in POLYPROPYLENE HANDBOOK 55–101 (Edward P. Moore, Jr., ed., Hanser Publishers 1990). Hydrogen and diethyl zinc are examples of agents that are very effective in the control of polymer molecular weight in olefin polymeriztions. Hydrogen is the preferred agent.

The concentration of chain termination agent in one stage is preferably sufficient to produce propylene homopolymer having a melt flow rate in the range of from 0.15 dg/min. to 4.0 dg/min, preferably from 0.2 dg/min to 2.0 dg/min, even more preferably from 0.2 dg/min to 1.0 dg/min and a molecular weight distribution (Mw/Mn) in the range from 1.8 to 2.5 and preferably from 1.8 to 2.3. The concentration of chain termination agent in a separate, either earlier or later stage, is preferably sufficient to produce homopolymer having a melt flow rate in the range of from 5 dg/min to 1000 dg/min, preferably from 20 dg/min to 200 dg/min and most preferably from 30 dg/min to 100 dg/min and a molecular weight distribution (Mw/Mn) in the range from 1.8 to 2.5 and preferably from 1.8 to 2.3.

The final homopolymer product comprises a reactor blend of the products prepared in the stages described above. Preferably the final product is comprised of from 40% to 80% product from the first or low melt flow rate stage and from 20% to 60% product from the second or high melt flow rate stage, more preferably from 55% to 65% product from the low melt flow rate stage and from 35% to 45% product from the high melt flow rate stage. The most desirable final melt flow rate is in the range of from 0.2 to 30 dg/min.

Although the focus of this invention is novel homopolymers with a unique combination of quite broad molecular weight distribution yet good physical properties and low extractables levels, it will be clear to persons skilled in the art that similarly unique combinations of properties will also be possible with copolymers, where controlled levels of comonomer(s) are additionally employed.

Individually, each stage may involve any process including gas, slurry or solution phase or high pressure autoclave processes. Preferably a slurry (bulk liquid propylene) polymerization process is used in each stage.

A slurry polymerization process generally uses pressures in the range of from 1 to 100 atmospheres (0.1 to 10 MPa) or even greater and temperatures in the range of from −60° C. to 150° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from 200 kPa to 7,000 kPa at a temperature in the range of from 50° C. to 120° C.

Polymer Compositions

The polymer compositions of this invention are a reactor blend of homopolymers, isotactic in one embodiment, having differing weight average molecular weights such that the overall polymer composition has a MWD (the ratio of the weight average molecular weight to number average molecular weight (Mw/Mn, or MWD)) that is in the range of from 2.5 to 20.0 in one embodiment, and from 2.8 to 12.0 in another embodiment, and from 3.0 to 8.0 in yet another embodiment, and is greater than 3.5 in one embodiment, and greater than 4.0 in another embodiment, and greater than 4.2 in another embodiment, and greater than 4.5 in yet another embodiment, and greater than 4.8 in yet another embodiment, and greater than 5.0 in yet another embodiment, and less than 20 in yet another embodiment, and less than 12.0 in another embodiment, and less than 10.0 in yet another embodiment, and less than 8.0 in yet another embodiment, wherein a desirable MWD range may be any combination of any upper MWD limit with any lower MWD limit described herein.

The propylene polymer compositions of this invention are particularly suitable for oriented film applications and preferably have a weight average molecular weight (MW) that is in the range of from 140,000 to 750,000 preferably from 150,000 to 500,000, and most preferably from 200,000 to 400,000 (of the polymer composition). These polymer compositions preferably have a melt flow rate (MFR) that is in the range of from 0.2 dg/min to 30 dg/min, preferably from 0.5 dg/min to 20.0 dg/min, even more preferably from 1.0 dg/min to 10.0 dg/min. The melting point of the polymer compositions are preferably greater than 145° C., more preferably greater than 150° C., and even more preferably greater than 155° C. Upper limits for melting point depend on the specific application and metallocene used but would typically not be higher than 180° C. The hexane extractables level (as measured by 21 CFR 177.1520(d)(3)(i)) of the final polymer product is preferably less than 2.0 wt %, more preferably less than 1.0 wt %, despite the broad MWD.

The polymers of this invention can be blended with other polymers, particularly with other polyolefins. Examples of such would be blends with conventional α-olefin homopolymers and copolymers.

The propylene homopolymers of this invention exhibit exceptional film orientability and the films exhibit a good balance of properties. Any film fabrication method may be used to prepare the oriented films of this invention as long as the film is oriented at least once in at least one direction. Typically, commercially desirable oriented polypropylene films are biaxially oriented sequentially or simultaneously. The most common practice is to orient the film first longitudinally and then in the transverse direction. Two well known oriented film fabrication processes include the tenter frame process and the double bubble process.

We have found that the novel structure of the isotactic propylene polymer compositions of this invention translates to distinct differences versus standard films made with today's Ziegler-Natta produced propylene polymers and compared with films produced in a single stage polymerization process designed to produce narrow molecular weight distribution. As discussed in more detail below, biaxial stretching studies show that the films of this invention have a substantially broader processability range and can be evenly stretched at lower temperature. Stretching studies at elevated temperatures on cast sheets along machine direction (MD) and transverse direction (TD) indicate that the films of this invention stretch easily without breaking at lower stretching temperatures when compared to Ziegler-Natta produced propylene polymers. This indicates a capability to operate at significantly higher line speeds on commercial tenter frame lines, while still making oriented films having good clarity, stiffness and barrier properties.

The final films of this invention may generally be of any thickness, however, preferably the thickness is in the range of from 1–150 $\mu$m, preferably 2–100 $\mu$m, and more preferably, 3 to 75 $\mu$m. There is no particular restriction with respect to draw ratio on film stretching, however, preferably the draw ratio is from 4 to 10 fold for monoaxially oriented films and from 4 to 15 fold in the transverse direction in the case of biaxially oriented films. Machine direction (MD) and transverse direction (TD) stretching is preferably carried out at a temperature in the range of from 70° C. to 200° C., preferably from 80° C. to 190° C. The films may be coextruded or laminated and/or may be single or multi-layered with the film of the invention comprising at least one component of the layers, typically the core layer.

Additives may be included in the film polymer compositions of this invention. Such additives and their use are generally well known in the art. These include those commonly employed with plastics such as heat stabilizers or antioxidants, neutralizers, slip agents, antiblock agents, pigments, antifogging agents, antistatic agents, clarifiers, nucleating agents, ultraviolet absorbers or light stabilizers, fillers and other additives in conventional amounts. Effective levels are known in the art and depend on the details of the base polymers, the fabrication mode and the end application. In addition, hydrogenated and/or petroleum hydrocarbon resins may be used as additives.

The film surfaces may be treated by any of the known methods such as corona or flame treatment. In addition standard film processing (e.g. annealing) and converting operations may be adopted to transform the film at the line into usable products.

Thus, one embodiment of the present invention is an olefinic polymer, desirably a propylene polymer composition comprising propylene homopolymer, the composition having a molecular weight distribution in the range from greater than 4.0, and hexane extractables of less than 2.0 wt %. Desirably, the composition comprises polymer made in a two or more stage process, the process for forming a polypropylene composition comprising the steps of:

(a) polymerizing propylene in the presence of a metallocene to produce a first propylene homopolymer having a melt flow rate in the range from 0.15 dg/min to 4.0 dg/min;

(b) polymerizing propylene in the presence of the first propylene homopolymer, thus forming a propylene polymer composition.

The propylene polymer composition can be characterized such that a 50.8 mm×50.8 mm×0.508 mm film formed from the propylene polymer composition exhibits an even stretch between the temperature ranges of from 150° C. to 159° C. when stretched to a final stretched thickness of 19 $\mu$m on a T. M. Long biaxial stretching apparatus after preheating the film for 27 sec and stretching the film at a rate of 76.2 mm/sec.

In one embodiment, the polymer composition has a melting point greater than 145° C.

In another embodiment, the polymer composition has a melt flow rate in the range of 0.2 dg/min to 30.0 dg/min.

In yet another embodiment, the polymer composition has a molecular weight distribution in the range of from 4.0 to 20.0, and from 4.2 to 20.0 in yet another embodiment.

Desirably, the composition comprises a first and second propylene homopolymer. In one embodiment, the first homopolymer comprises from 40 percent to 80 percent of the composition, and the second homopolymer comprises from 20 percent to 60 percent of the composition. In another embodiment, the first homopolymer has a molecular weight distribution of from 1.8 to 2.5, and the second homopolymer has a molecular weight distribution of from 1.8 to 2.5 in another embodiment. Further, the first homopolymer has a melt flow rate of from 0.15 dg/min to 4.0 dg/min in one embodiment, and the second homopolymer has a melt flow rate of from 5 dg/min to 1000 dg/min in another embodiment.

In another embodiment, one or both of the first propylene homopolymer or second propylene homopolymer is isotactic. In yet another embodiment, one or both of the first propylene homopolymer or second propylene homopolymer is highly isotactic. To further characterize the homopolymers, the first or second propylene homopolymer has a melt flow rate (MFR) of from 5 dg/min to 1000 dg/min in one embodiment, and the first or second propylene homopolymer has a melt flow rate (MFR) of from 20 dg/min to 200 dg/min in another embodiment.

The olefinic composition, desirably a polypropylene composition, has a weight average molecular weight that is in the range of from 140,000 to 750,000 in one embodiment, and a melt flow rate (MFR) of from 0.2 dg/min to 30 dg/min in another embodiment. These and other properties of the polymer composition make it suitable for such applications as films and oriented films. These films may have a final stretched thickness of from 10 $\mu$m to 30 $\mu$m in one embodiment, and from 14 $\mu$m to 26 $\mu$m in another embodiment.

Test Methods

Molecular Weight Determinations. Molecular weights and molecular weight distributions (MWD) were determined using Gel Permeation Chromatography. Techniques for determining the molecular weight (Mn and Mw) and molecular weight distribution (MWD) were used as in U.S. Pat. No. 4,540,753 to Cozewith et al. and references cited therein, and in Verstrate et al., 21 *Macromolecules* 3360 (1988) and references cited therein.

Melting Temperature. The melting temperature and crystallization temperature were determined from peak temperatures from differential scanning calorimeter (DSC) runs at 10° C./min. heating and cooling rates.

Melt Flow Rate. MFR was determined via the method of ASTM D 1238-95 Condition L.

Extractables. Hexane extractables testing was determined using n-hexane solvent per the procedure of 21 CFR 1.77 1520(d)(3).

EXAMPLES

A polypropylene consistent with this invention, Sample A, was compared to standard, narrow MWD metallocene-based and to conventional Ziegler-Natta based propylene polymers as follows. Sample A (invention) was prepared as follows.

A catalyst system precursor solution was prepared by combining 343 g of 30 wt % methylalumoxane in toluene (Albemarle Corp., Baton Rouge, La.) representing 1.76 moles Al with 6.36 g of dimethylsilylbis(2-methyl-4-phenyl-idenyl) zirconium dichloride (0.01 moles Zr) by stirring. Then 367 g of toluene was added and stirring was continued for 15 minutes. The precursor solution (625.9 g) was added to 392 g of Davison XPO 2407 silica (1.4–1.5 cc/g pore volume—available from W. R. Grace, Davison Chemical Division, Baltimore, Md.) previously heated to 600° C. under $N_2$. The ratio of liquid volume to total silica pore volume was 1.10. The solid had the consistency of damp sand and was dried at reduced pressure (483+mm Hg vacuum) and temperatures as high as 50° C. over 16 hours. 485.5 g finely divided, free-flowing solid catalyst were obtained. Elemental analysis showed 0.09 wt % Zr and 7.37 wt % Al.

Several batches of catalyst system were combined to provide the charge for the polymerization run. The catalyst system was oil slurried with Drakeol™ white mineral oil (Witco Chemical) for ease of addition to the reactor. The procedure for polymerizing Sample A was as follows. The polymerization was conducted in a pilot scale, two reactor, continuous, stirred tank, bulk liquid-phase process. The reactors were equipped with jackets for removing the heat of polymerization. The reactor temperature was set at 70° C. in the first reactor and 66° C. in the second reactor. Catalyst was fed at a rate of 6.6 g/hr. TEAL (2 wt % in hexane) was used as a scavenger at a rate of 1.6 g/hr. The catalyst system prepared above was fed as a 20% slurry in mineral oil and was flushed into the reactor with propylene. Propylene monomer was fed to the first reactor at a rate of 80 kg/hr and to the second reactor at a rate of 27 kg/hr. Hydrogen was added for molecular weight control at 500 mppm in the first reactor and 5000 in the second reactor. Reactor residence time was about 2.3 hours in the first reactor and about 1.7 hours in the second reactor. Polymer production rates were 16 kg/hr in the first reactor and 8 kg/hr in the second reactor. Polymer was discharged from the reactors as granular product having a MFR of 3.7 dg/min. 60% of the final polymer product was derived from the first stage and 40% of the final polymer product was derived from the second stage.

Sample B (metallocene control) was prepared in similar fashion as described above for Sample A.

The procedure for polymerizing Sample B was the same as for Sample A except Hydrogen was added at 500 mppm to the first reactor and 900 mppm to the second reactor.

Sample C (Z-N control) is a commercial product available from Exxon Chemical Company (PP4782) It is a reactor blend of a propylene homopolymer and propylene/ethylene copolymer with a melt flow rate of 2.1 dg/min and an ethylene content of 0.6 wt %.

Sample D was prepared as follows. The polymerization was conducted in a pilot scale, two reactor, continuous, stirred tank, bulk liquid-phase process. The reactors were equipped with jackets for removing the heat of polymerization. The reactor temperatures were 70° C. in the first reactor and 64.5° C. in the second reactor. Catalyst was fed at a rate of 3.5 g/hr. TEAL (2.0 wt % in hexane) was used as a scavenger at a rate of 17 wppm. The catalyst system prepared above was fed as a 20% slurry in mineral oil and was flushed into the first reactor with propylene. Propylene monomer was fed to the first reactor at a rate of 80 kg/hr and to the second reactor at a rate of 30 kg/hr. Hydrogen was added for molecular weight control at 500 mppm in the first reactor and 8000 in the second reactor. Reactor residence time was about 2.5 hours in the first reactor and about 1.8 hours in the second reactor. Polymer production rates were about 20 kg/hr in the first reactor and 11 kg/hr in the second reactor. Polymer was discharged from the reactors as granular product having a MFR of 1 dg/min. 65% of the final polymer product was derived from the first stage and 35% of the final polymer product was derived from the second stage.

The invention polymer (Samples A), metallocene-catalyzed control (Sample B) Ziegler-Natta catalyzed control (Samples C) were converted to biaxially oriented films to assess ease of stretching and orientation. This step is recognized to be the critical point in the fabrication of such oriented films. One of the procedures adopted was one that is widely used in the art and involved cast extrusion of a sheet of polymer (typically 500 $\mu$m to 650 $\mu$m thick) followed by biaxial orientation at elevated temperature on a stretching apparatus such as a film stretcher from the TM Long Co., Somerville, N.J. (henceforth referred to as TM Long machine) to yield a final thickness of 15 $\mu$m to 25 $\mu$m. Ease of film stretching or orientation was judged from the uniformity of stretching (i.e., even stretch versus the presence of stretch bands), film sagging and in the most severe case, film breakage. A desired stretching profile is one that offers even stretching, without any stretch bands, breakage or sagging over a wide range of stretching temperatures.

Figure 1A:
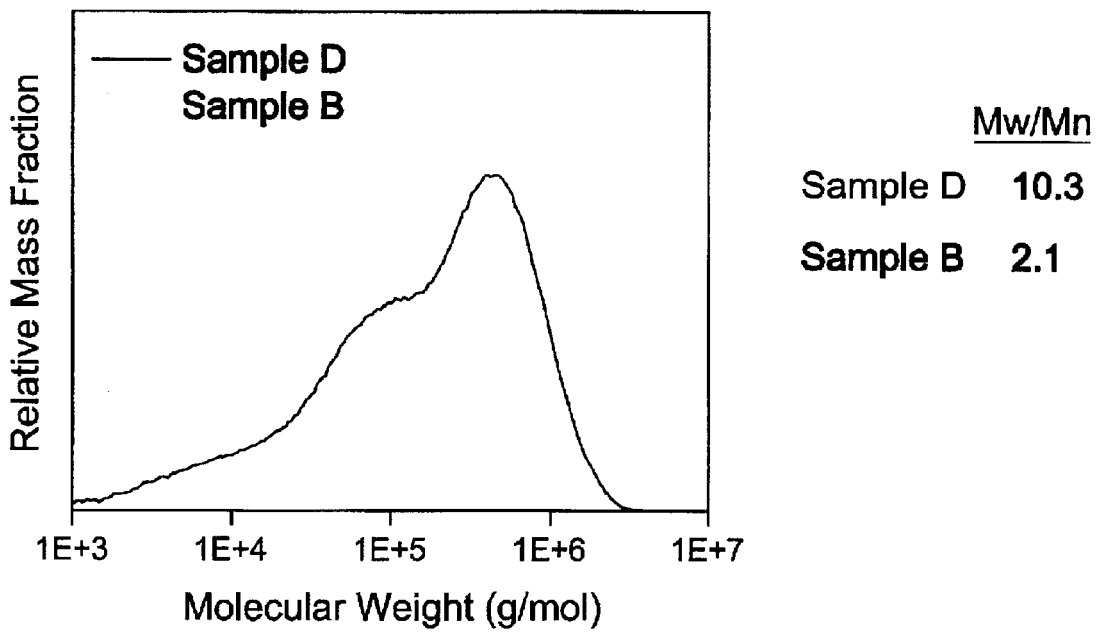
FIG. 1A is a plot of the GPC Molecular Weight Distribution of example and comparative polymers of the invention.

As a result of the highly unbalanced MFR in a two-stage polymerization, invention polymer (Sample A) from this process exhibits a relatively broad molecular weight distribution. A comparison of the molecular weight distribution of Sample A versus Samples B and C is shown in FIG. 1. Sample A has a molecular weight distribution (Mw/Mn) broader than the narrow molecular weight distribution metallocene (Sample B) and close to that of Ziegler-Natta polymer (Sample C). Low extractables are maintained despite the broadening of MWD. As a further illustration of the substantial MWD broadening possible with the invention polymers, the case of Sample is shown in FIG. 1A. Sample D has an MFR of 1 dg/min. Despite the substantial level of molecular weight distribution broadening attained (Mw/Mn 10.0), the hexane extractables for Sample D was only 0.8 wt %. The xylene solubles was 1.16 wt %. Key resin parameters are compared in Table 1. A film processability study was conducted using a T. M. Long (made in 1991) biaxial stretching apparatus to compare the range of temperatures over which uniform stretching is achieved. A 20 mil thick sheet was first prepared on a Killion cast line and then cut into 50.8 mm×50.8 mm (2"×2") square plaques for the processability study. During the processability study, each sample plaque was preheated for 27 seconds followed by biaxial stretching at 76.2 mm/sec (3"/sec) strain rate to form a 304.8 mm×304.8 mm (12"×12") oriented film. Even stretch was judged by observing the film area for good stretching uniformity with lack of unstretched marks or sagging marks.

Figure 2:
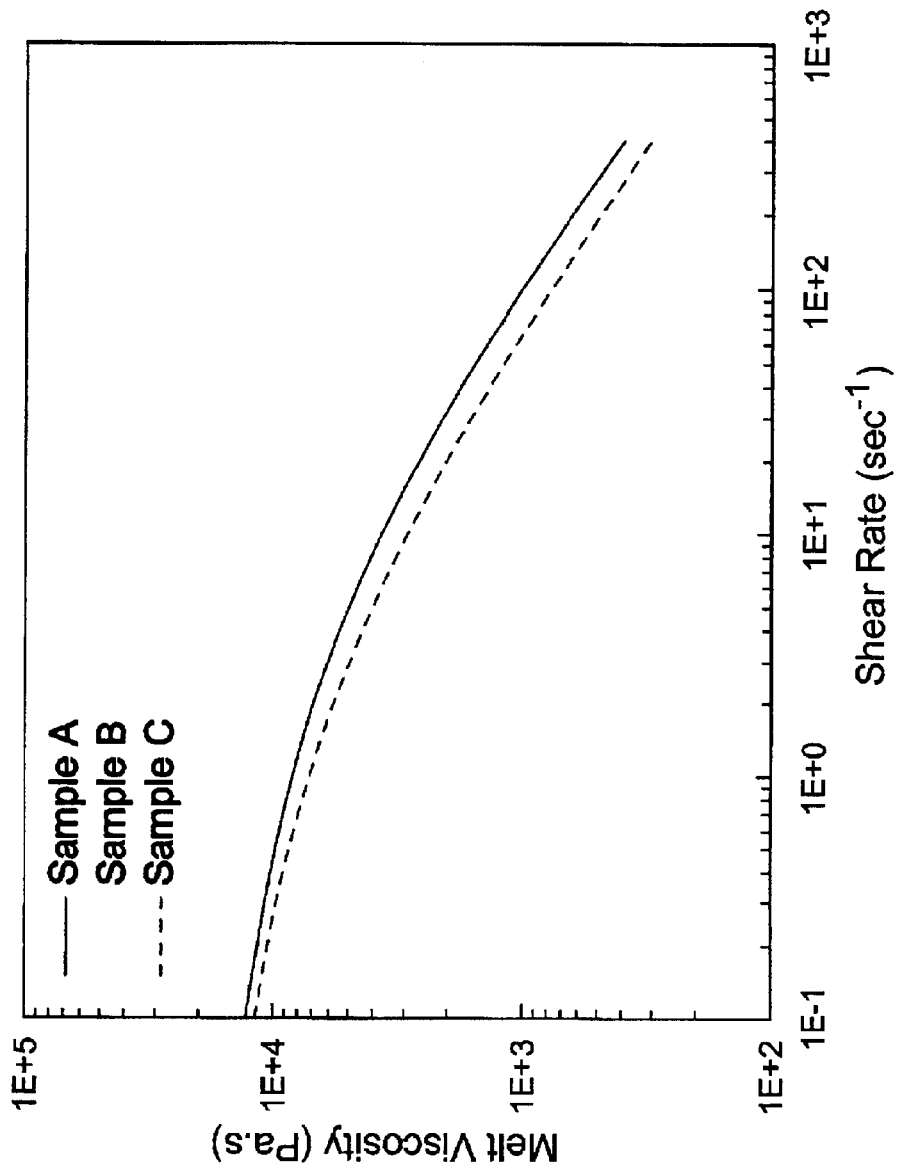
FIG. 2 is a plot of the Melt Viscosity as a function of Shear Rate for various example and comparative polymers of the invention.
Figure 3:
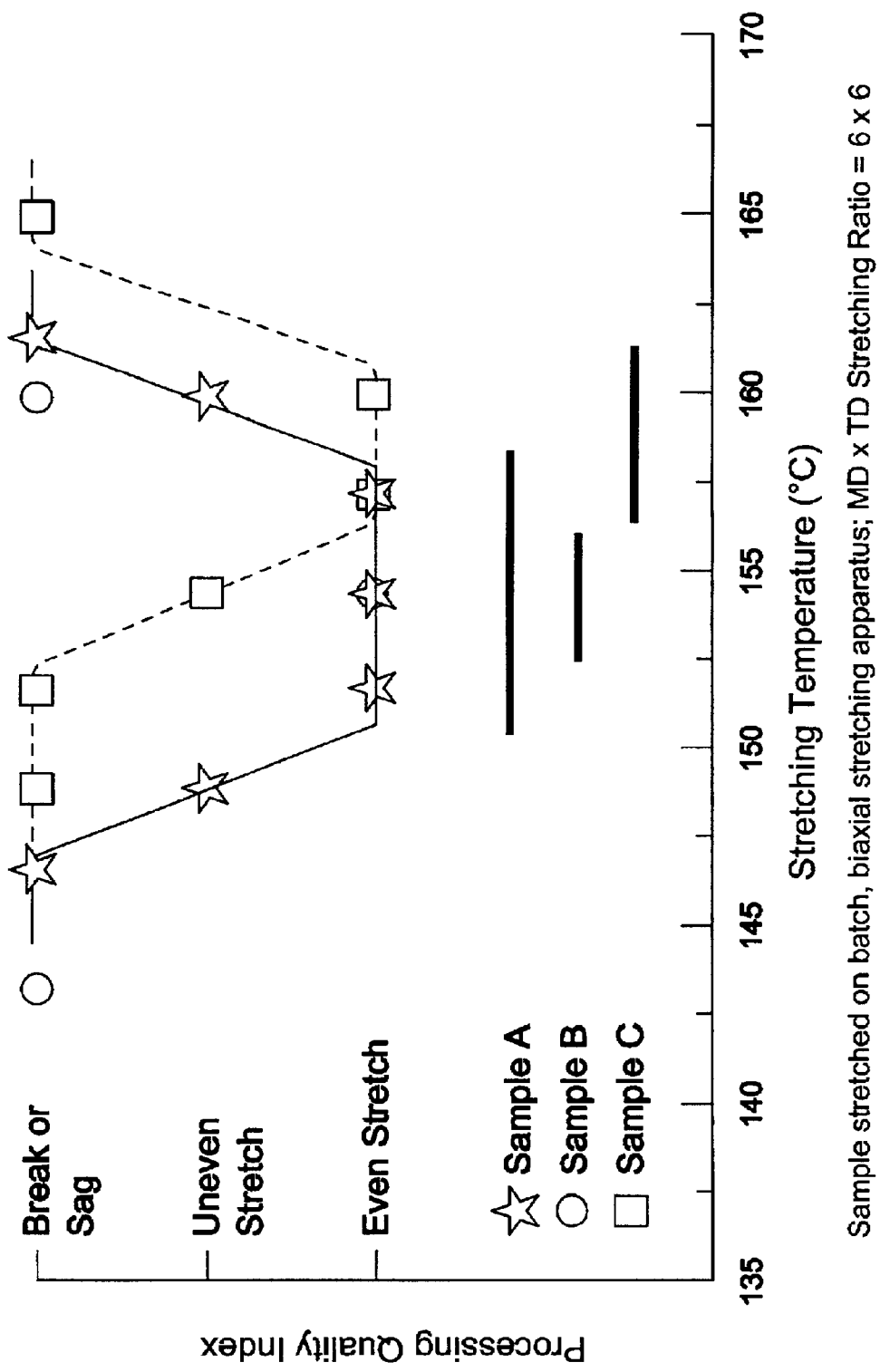
FIG. 3 is a representation of the relative Processability Range during Biaxial Orientation of the various example polymers of the invention, wherein the samples were stretched on a batch, biaxial stretching apparatus, MD×TD stretching ratio is 6×6.

The film processabilities of the polymers are compared in Table 2 and FIG. 2. The stretching performance of Sample A is seen to be superior to those of Samples B and C. In particular, Sample A achieves greater processing latitude and the capability of stretching at reduced oven temperatures—two desirable features for potential high speed biaxially oriented tenter line applications.

As shown in Table 3, the film properties of Sample A compare favorably with those of Samples B and C. Normally, the most important properties in OPP product performance are high stiffness, low haze, high moisture barrier and low heat shrinkage. The high barrier and stiffness properties offer better food preservation and thinner gauge and lower heat shrinkage improves the heat resistance of high speed multicolor printing at high temperature. Surprisingly, the shrinkage of Sample A film is maintained despite its lower melting temperature.

Although the Examples deal primarily with films, it will be instantly recognized that the attributes of the invention polymers will lend themselves to use in other end-application areas as well. For example, in thermoforming and blow molding, fibers and fabrics, the increased melt strength derived from the broadening of distribution to the high molecular weight end, coupled with the easier orientability at lower temperatures, should result in performance benefits versus standard, narrow molecular weight distribution metallocene-catalyzed propylene polymers, as well as conventional Ziegler-Natta propylene polymers, while maintaining the general low extractable attribute of metallocene-catalyzed propylene polymers.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 2

Biaxially Oriented Film Processability*

| Stretching Temperature (° C.) | Sample A | Sample B | Sample C |
|---|---|---|---|
| 140.6 | — | — | — |
| 143.3 | — | B | — |
| 146.1 | B | — | — |
| 148.9 | U | U | B |
| 151.7 | E | U | B |
| 154.4 | E | E | U |
| 157.2 | E | U | E |
| 160.0 | U | S | E |
| 166.0 | S | — | S |

*Samples stretched on TM Long stretching apparatus; MD × TD stretching ratio = 6 × 6; preheat time 27 sec; stretch rate 76.2 mm/sec (3 in/sec); initial sheet thickness ~500 μm (20 mil); final stretched film thickness ~20 μm (0.75 mil) E = Even stretch, U = Uneven stretch (i.e., unstretched marks/unstretched regions), B = Break, S = Sagging

TABLE 3

Biaxially Oriented Film Properties*

| Film Property | Sample A Invention | Sample B (Control) | Sample C (Control) |
|---|---|---|---|
| Thickness, μm | 18 | 18 | 16 |
| Haze % | 0.2 | 0.3 | 0.4 |
| Gloss % | 95 | 95 | 95 |
| WVTR @ 37.8° C. & 100% RH, g/m²/day per 25.4 μm | 5.3 | 5.3 | 5.8 |
| 1% Sec. Modulus, MPa (kpsi) | 2372 (344) | 2468 (358) | 2356 (342) |
| Ultimate Tensile Strength, MPa (kpsi) | 193 (28) | 217 (32) | 206 (30) |
| Shrinkage at 135° C./180 s, % | 19 | 21 | 20 |
| Ultimate Elongation, % | 65 | 75 | 67 |

*Films prepared on TM Long stretching apparatus; MD × TD stretching ratio = 6 × 6; preheat time 27 sec. Film thickness determined using a profilometer; Haze measured per ASTM D 1003; Gloss per ASTM D 2457; WVTR per ASTM F 372; Tensile properties and 1% secant modulus by ASTM D 882. Stretching temperature was 154° C. for samples A and B & 157° C. for Sample C.

We claim:

1. A biaxially oriented film comprising a propylene polymer composition comprising propylene homopolymer, the composition having a molecular weight distribution greater than 4.0, and hexane extractables of less than 2.0 wt %.

2. The biaxially oriented film of claim 1, wherein a sample of the biaxially oriented film having pro-stretched dimensions of a 50.8 mm×50.8 mm×0.508 mm exhibits an even stretch between the temperature ranges of from 150° C. to

TABLE 1

Description of Samples*

| Sample | Catalyst | MFR | Melting Temp. (° C.) | Mw/Mn | Hexane Extractables (wt %) | Crystallization Temp. (° C.) |
|---|---|---|---|---|---|---|
| A (invention) | MCN | 2.0 | 151 | 3.7 | 0.5 | 111 |
| B (control) | MCN | 2.0 | 151 | 2.1 | 0.3 | 110 |
| C (control) | Z-N | 2.1 | 157 | 4.4 | 1.7 | 110 |
| D (invention) | MCN | 1.0 | 151 | 10.3 | 0.8 | 111 |

*MFR was determined via the method of ASTM D 1238-95 Condition L. The melting temperature and crystallization temperature were determined from peak temperatures from DSC runs at 10° C./min. heating and cooling rates. Mw/Mn was determined using Gel Permeation Chromatography. Percent hexane extractables was determined via 21 CFR 177.1520 (d)(3)(i).

159° C. when stretched to a final stretched thickness of 19 μm on a T. M. Long biaxial stretching apparatus after preheating the film for 27 sec and stretching the film at a rate of 76.2 mm/sec.

3. The biaxially oriented film of claim 1, wherein the composition has a melting point greater than 145° C.

4. The biaxially oriented film of claim 1, wherein the composition has a melt flow rate in the range of 0.2 dg/min to 30.0 dg/min.

5. The biaxially oriented film of claim 1, wherein the composition has a molecular weight distribution in the range of from 4.0 to 20.0.

6. The biaxially oriented film of claim 1, wherein the composition has a molecular weight distribution in the range of from 4.2 to 20.0.

7. The biaxially oriented film claim 1, wherein the composition has a weight average molecular weight that is in the range of from 140,000 to 750,000.

8. The biaxially oriented film of claim 1, wherein the composition has a molecular weight distribution greater than 4.5.

9. The biaxially oriented film of claim 1, wherein the composition has a molecular weight distribution greater than 4.8.

10. The biaxially oriented film of claim 1, wherein the composition has a molecular weight distribution greater than 5.0.

* * * * *